United States Patent [19]

Iijima et al.

[11] Patent Number: 5,073,739
[45] Date of Patent: Dec. 17, 1991

[54] VIBRATION-COUPLING TYPE ULTRASONIC ACTUATOR AND METHOD FOR OPERATING THE SAME

[75] Inventors: Tamotsu Iijima, Kofu; Kazuhide Sano, Yamanashi, Japan

[73] Assignee: Nisca Corporation, Yamanashi, Japan

[21] Appl. No.: 661,195

[22] Filed: Feb. 27, 1991

[30] Foreign Application Priority Data

Feb. 27, 1990 [JP] Japan .................................. 2-46606

[51] Int. Cl.⁵ ............................................ H01L 41/08
[52] U.S. Cl. ...................................................... 310/323
[58] Field of Search .................. 310/316, 317, 323, 328

[56] References Cited

U.S. PATENT DOCUMENTS

| | | | |
|---|---|---|---|
| 4,857,793 | 8/1989 | Okuno | 310/323 |
| 4,882,500 | 11/1989 | Iijima | 310/323 |

FOREIGN PATENT DOCUMENTS

| | | | |
|---|---|---|---|
| 58-32518 | 7/1983 | Japan . | |
| 0239875 | 10/1987 | Japan | 310/323 |
| 0039474 | 2/1988 | Japan | 310/323 |
| 0277477 | 11/1988 | Japan | 310/323 |

OTHER PUBLICATIONS

Construction of Ultrasonic Motors and their Application, Proceedings of 8th Symposium on Ultrasonic Electronics, Tokyo 1987, Japanese Journal of Applied Physics, vol. 27 (1988) Supplement 27-1, pp. 195-197, Yoshiro Tomikawa et al.

Ultrasonic Motors Using Piezoelectric Ceramic Multi--Mode Vibrators, Proceedings of 8th Symposium on Ultrasonic Electronics, Tokyo 1987, Japanese Journal of Applied Physics, vol. 27 (1988), Supplement 27-1, pp. 192-194, Takehiro Takano et al.

An Ultrasonic Motor Using Non-Axisymmetric Vibration Modes of a Piezo-Ceramic Annular Plate, Proceedings of 9th Symposium on Electronics, Sendai 1988, Japanese Journal of Applied Physics, vol. 28 (1989), Supplement 28-1, pp. 161-163, Yoshiro Tomikawa et al.

An Ultrasonic Motor Using Non-Axisymmetric Vibration Modes of a Piezo-Ceramic Annular Plate, Proceedings of the 7th Meeting on Ferroelectric Materials and their Applications, Kyoto 1989, Japanese Journal of Applied Physics, vol. 28 (1989), Supplement 28-2, pp. 202-205, Takehiro Takano et al.

Ultrasonic Motors Using Piezoelectric Ceramic Multi--Mode Vibrator, Ferroelectrics, 1989, vol. 95, pp. 165-169, T. Takano et al.

Linearly Moving Ultrasonic Motor Using a Multi--Mode Vibrator, Proceedings of 9th Symposium in Ultrasonic Electronics, Sendai 1988, Japanese Journal of Applied Physics, vol. 28 (1989), Supplement 28-1, pp. 164-166, Takehiro Takano et al.

Constructions and Characteristics of Ultrasonic Motors Using a Piezo-Ceramic Annular Plate, IEEE 1989 Ultrasonics Symposium, Oct. 3-6, 1989, pp. 167-170, Takehiro Takano et al.

*Primary Examiner*—Mark O. Budd
*Attorney, Agent, or Firm*—Oblon, Spivak, McClelland, Maier & Neustadt

[57] ABSTRACT

An ultrasonic actuator using longitudinal and bending vibrations which are effectively coupled by controlling piezoelectricity generated in one of piezoelectric members attached onto an elastic vibrational member. Discharging electric charge induced in the piezoelectric member due to vibrations excited in the vibrational member, the piezoelectric member varies in stiffness to bring about electrical asymmetry within the vibrational member and allow the vibrations induced in the vibrational member to be coupled. Consequently, the ultrasonic actuator can be activated by single-phase alternating current with high efficiency.

18 Claims, 6 Drawing Sheets

VIBRATION-COUPLING TYPE ULTRASONIC ACTUATOR AND METHOD FOR OPERATING THE SAME

BACKGROUND OF THE INVENTION

1. Field of the Invention

This invention relates to a vibration-coupling type ultrasonic actuator capable of being effectively activated by coupling multi-mode vibrations excited with single phase current, and a method capable of coupling multi-mode vibrations excited with the single phase current by controlling the electrical and vibrational characteristic of a piezoelectric member so as to operate the ultrasonic actuator with high efficiency.

2. Description of the Prior Art

When a plate-like elastic vibrational member is excited by frequencies resonant with one or more factors of the length, width and thickness of the vibrational member, standing-wave vibrations (elastic wave) of some inherent modes can be observed. There are caused vibrations of longitudinal mode, transverse (thikness) mode, bending (flexural) mode, torsional mode, sliding mode, spreading mode and other possible modes. Recently, these modes of vibrations have been widely applied to mechanical-electric filters, various ultrasonic motors and so on. Since the ultrasonic motor has no need of a moving member such as a rotor used in a common electric motor and can serve as a linear motor applicable to, for example, peripheral equipments for business computers such as card readers, and sheet-feeding machines in copying machines. The motor of this type can activate directly a moving object such as paper in the card reader with efficiency.

Figure 1:
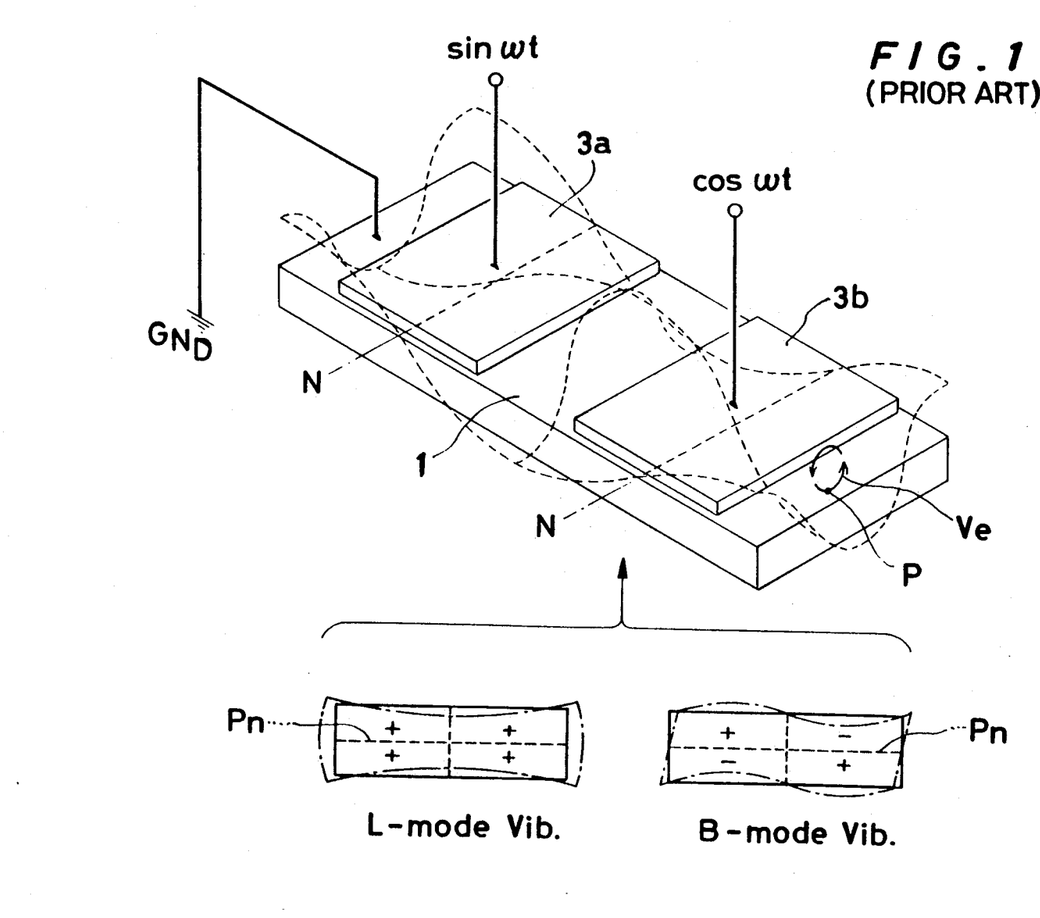
FIG. 1 is schematic diagram of a conventional ultrasonic actuator, illustrating an elliptic motion caused by coupling multi-mode vibrations.

The vibrations of the foregoing modes all are the so-called standing-wave vibrations having periodic motions such that the elastic vibrational member expands and contracts repeatedly in one direction. As illustrated in FIG. 1, the longitudinal mode stands for a stretching vibration caused in the lengthwise direction of the elastic vibrational member (L-mode vibration). In the bending mode, the elastic vibrational member is caused to be periodically strained in the opposite directions at the upper and lower parts differentiated by the neutral plane Pn (B-mode vibration). In one of the vibration modes, a stretching motion caused inside the vibrational member in the orthogonal direction or specific direction is imparted to the moving member (rotor in a motor) which comes in point or face contact with the vibrational member. Consequently, the moving member being in contact with the vibrational member is subjected to a unidirectional rectilinear motion or rotary motion.

The ultrasonic motor merely utilizing a simple unidireclional-stretching motion caused on the elastic vibrational member is a so-called "poking-type ultrasonic motor" actuated by single-mode vibration (1st resonant in-plane vibration). Japanese Patent Publication NO. SHO 58(1983)-32518(B2) discloses a single-mode ultrasonic motor actuated by longitudinal mode vibration. This prior art motor has an advantage that it can be exited with single phase current. However, the motor of this type renders the controlling of alteration in direction of rotation and stable activation with strong torque difficult, and besides, cannot efficiently be actuated in the reverse direction even if it can be reversed.

It would be possible to excite a plurality of modes of in-plane vibrations (multi-mode vibrations), for example, the longitudinal vibration together with the bending vibration by applying polyphase currents to the elastic vibrational member.

There have been briskly conducted researches in utilization of the multi-mode (two-mode) vibrations for a driving system wherein two of the vibration modes including the longitudinal vibration, transverse vibration and bending vibration are typically combined. In a general sense, the multi-modes is comprehensive of the in-plane vibrations of the same mode which are excited with alternating currents differring in phase.

However, the ultrasonic motor using the multi-modes of vibrations entails problems such as difficulty in controlling the application of the polyphase alternating currents differring in resonance phase and complexity in structure.

In a case of exciting the elastic vibrational member with the polyphase currents, kinetic energy designated by the composite vectors of geometrically orthogonal displacements at arbitrary points on the surface of the vibrational member can be obtained in the form of an elliptic motion. In a vibrational system, where two modes of vibrations are "coupled" with resonant frequencies, the amplitude energy of one of the multi-mode vibrations partially enters into the other mode vibration, to thereby intensify the amplitude motion caused elliptically (elliptic motion) of the latter vibration.

As shown schematically in FIG. 1, the elliptic motion Ve is generated on the surface of an elastic vibrational member 1 shaped in a rectangular plate by applying two-phase alternating currents V1 (cos $\omega t$) and V2 (sin $\omega t$) having specific frequency to piezoelectric vibrators 3a, 3b attached to the vibrational member 1. The vibrational member 1 has the dimensions (length, width and thickness) designed so as to cause resonance with the alternating currents applied to the vibrators to thereby excite longitudinal (L-mode) vibration and bending (B-mode) vibration. The longitudinal and bending vibrations can concurrently be produced inside the elastic vibrational member 1 with either of the alternating currents, whereas the vibrations excited by the single-phase current can in no way be coupled. Therefore, the kinetic energy resultantly produced from the vibrations corresponds merely to the composite vector of the longitudinal and bending vibrations. The concurrent application of the polyphase alternating currents brings about the "coupling" of the longitudinal and bending vibrations to produce intensive elliptic motions (motion Ve at an arbitrary point P on the vibrational member 1). Reference symbol N in the drawing denotes the mode of the longitudinal vibration which is induced inside the vibrational member but does not vary in the transverse direction.

When the vibrational member is formed asymmetrically with respect to the neutral plane Pn, the longitudinal and bending vibrations are of course coupled with the single phase current, whereas it is impossible to form a vibrational member having the ideal geometric shape which effectively produces resonance in vibration from a technical viewpoint. The vibrational member which is awkward in resonance cannot efficiently be activated.

As is understood from the foregoing, there has been so far required polyphase currents having phase difference in order to obtain an ultrasonic motor excelling in driving torque, performance and controllability.

Namely, the conventional ultrasonic motor has attained the coupling of the multi-mode vibrations to produce the elliptic motions on the elastic vibrational member by use of the polyphase alternating currents. Furthermore, in order to reverse the direction of the elliptic motions thus produced, the polarity of the power source to be applied to the vibrators has generally to be reversed. Employing the method of reversing the polarity of the power source, disadvantageously, the structure of a controlling system for the ultrasonic motor would be complicated.

Even if the elastic vibrational member on which the elliptic motions are induced may be so formed as to be resonated with the frequency of the exciting vibrations, the resonant frequency of the vibrational member undergoes a change due to physical factors such as the mass changes which are caused by providing the piezoelectric vibrators and electrodes onto the vibrational member. As a result, the multi-mode vibrations would fail to be coupled, and therefore, the ultrasonic motor could not be activated with high efficiency.

OBJECT OF THE INVENTION

In view of the aforesaid drawbacks of conventional ultrasonic motors relying on coupling phenomenon of multi-mode vibrations, it is an object of the present invention to provide an ultrasonic actuator and a method for operating the actuator, which can attain effective coupling of multi-mode vibrations with a single-phase alternating current by utilization of the electric characteristic of an elastic vibrational member and/or piezoelectric vibrators attached to the vibrational member to thereby produce elliptic motions with notably high efficiency.

Another object of this invention is to provide a vibration-coupling type ultrasonic actuator simple in structure and having improved performance, controllability and reliability, which can fully compensate fluctuations in resonance vibrations with ease, which occur due to environmental factors such as the mass changes caused by providing piezoelectric menbers and other possible factors on the vibrational member, consequently to be manufactured and assembled readily.

A further object of this invention is to provide an ultrasonic actuator of such type which can easily and accurately adjust the momentum produced by exciting the vibrational member and reverse the direction of the elliptic motion induced on the vibrational member so as to attain a high efficiency reversible motor.

Another object of this invention is to provide an ultrasonic actuator having a fixing structure capable of fixedly supporting the actuator body without degenerating the vibrations excited inside the vibrational member.

SUMMARY OF THE INVENTION

To attain the objects described above according to the present invention, there is provided a vibration-coupling type ultrasonic actuator comprising an elastic vibrational member having a shape in which longitudinal and bending vibrations are concurrently produced with resonance frequency, an exciting means formed on the vibrational member and adapted to excite the vibrational member, at least one piezoelectric member disposed on the vibrational member about a common node of the vibrations produced inside the vibrational member, and at least one resonance controlling means being in electrical connection with vibrational member and piezoelectric member.

The present invention further provide a method for operating a vibration-coupling type ultrasonic actuator having an elastic vibrational member formed so as to concurrently produce longitudinal and bending vibrations, and at least one piezoelectric member disposed on the vibrational member, which comprises exciting the vibrational member with a single phase alternating current so as to generate difference of eleclric potential in the piezoelectric member, and discharging the potential generated in the piezoelectric member to the vibrational member to thereby cause the longitudinal and bending vibrations produced in the vibrational member to be coupled.

With application of vibrations or a single phase alterrating current having resonance frequency to the elastic vibrational member, the longitudinal and bending vibrations are concurrently produced inside the vibrational member. As one example, two piezoelectric members are disposed one on either surface of the vibrational member shaped in a plate and electrically interconnected with the vibrational member through the resonance controlling means. The resonance controlling means may be composed of a switching element and/or variable capacity element.

Applying the alternating current to the elastic vibrational member, the difference of electric potential occurs between the vibrational member and the respective piezoelectric members. By discharging the elecric potential generated in one of the piezoelectric members in relative to the vibrational member through the resonance controlling means, the piezoelectric member from which the electric potential is discharged varies in stiffness to thereby bring about electrical asymmetry within the vibrational member. Namely, one of the piezoelectric members assumes the "short-circuit" state, and the other piezoelectric member assumes the "open-circuit" state. Consequently, the longitudinal and bending vibrations are coupled due to the electrical asymmetry of the vibrational member to transfer the vibrational kinetic energy between the longitudinal and bending vibrations, while inducing the desired elliptic motion which is unidirectional rotation motion on the surface of the vibrational member. With the elliptic motion on the vibrational member, a moving member such as a rotating roller being in frictional contact with the vibrational member can be activated.

When the short-circuit and open-circuit states of the piezoelectric members are reversed, the direction of rotation of the elliptic motion occurring on the vibrational member is reversed. Thus, the direction in the moving member is moved can be reversed with ease.

By controlling the capacitance of the variable capacity element serving as the resonance controlling means, the resonance frequency inherent in the vibrational member can easily change and be adjusted subtly. Thus, possible deviation in resonance frequency caused due to, for example, an error in measurment in making the vibrational member and other elements can be compensated with high accuracy.

The elastic vibrational member may be formed of a piezoelectric material so as to be applied with an exciting current to vibrate spontaneously. Otherwise, the vibrational member may be of a metal plate and provided on at least one wide surface thereof with piezoelectric member so as to apply the exciting current to the piezoelectric member to excite multi-mode vibrations inside the vibrational member.

The elastic vibrational member constituting the ultrasonic actuator in conjunction with the piezoelectric member may preferably be retained at a common node of the longitudinal and bending vibrations occurring inside the vibrational member, so that attenuation of the vibrations excited inside the vibrational member which is possibly caused by retaining the vibrational member can be reduced to a minimum.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The ultrasonic actuator according to the present invention is effectively activated by coupling, in particular, longitudinal and bending vibrations excited with single-phase or polyphase alternating current. In the ultrasonic actuator of this invention, the resonance of the vibrations can be controlled finely. The principle of operation of the ultrasonic actuator of this invention will be described below with reference to FIG. 2.

Figure 2:
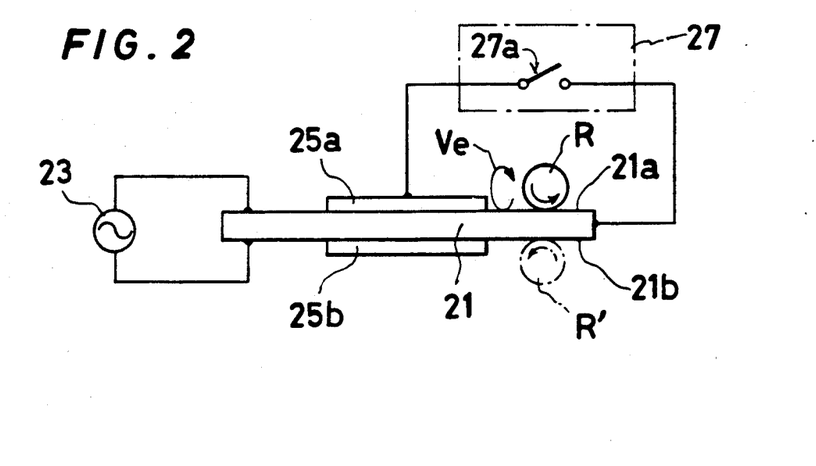
FIG. 2 is a side view schematically showing a first embodiment of an ultrasonic actuator according to this invention.

The vibration-coupling type ultrasonic actuator of this embodiment comprises an elastic vibrational member 21 formed in the shape of a rectangular plate, an exciting means 23 for exciting the vibrational member 21 to induce the longitudinal and bending vibrations, piezoelectric members 25a, 25b being in face contact with the respective wide surfaces 21a, 21b of the vibrational member 21, and a resonance controlling means 27 through which one of the piezoelectric members (member 25a) is externally connected electrically with the vibrational member 21, as shown in FIG. 2.

In this embodiment, a single-phase alternating current source is used as the exciting means 23 for applying high-frequency electric current to the vibrational member 21. In this case, it is necessary to form the vibrational member 21 of an electrostrictive or piezoelectric material, e.g. ferroelectric ceramics such as barium titanate and lead zirconate titanate (PZT).

The frequency of the high-frequency current to be given to the vibrational member 21 is to be resonant with the dimensions of the vibrational member so as to excite standing-wave vibrations of longitudinal mode and bending mode in the vibrational member. It is therefore required to determine the dimensions (length, width and thickness) of the vibrational member 21 in order to cause resonance with the specific frequency of single phase alternating current applied thereto, consequently to spontaneously produce the longitudinal and bending vibrations inside the vibrational member. That is, the length l, width w, and thickness t of the vibrational member 21 can be determined by the following equation:

$$(\pi/l) = (a^2/w^2)(t/\sqrt{12}) \tag{1}$$

wherein, $a$ represents the index of the vibrations. The above equation is a general expression obtained where the resonance frequency $fL$ of the longitudinal vibration and the resonance frequency $fB$ which are given by the following equations (2) and (3) are substantially equal to each other ($fL = fB$).

$$fL = (1/2l)(E/\sigma) \tag{2}$$

$$fB = (a^2/2\pi w^2)\{(\sqrt{E/\sigma})\}(t/\sqrt{12}) \tag{3}$$

wherein, E represents the Young's modulus, and $\sigma$ the density of the vibrational member.

Where the conditions expressed by the above equation (1) is satisfied, the length, width and thickness of the vibrational member 21 may be arbitrarily determined. Under this condition, the desired bending vibration can be concurrently induced with the longitudinal vibration by applying the single phase alternating current of resonance frequency for producing the longitudinal vibration from the exciting means 23 to the vibrational member 21.

The piezoelectric members 25a, 25b in this embodiment assume the shape of a rectangular plate, and come in face contact with the respective wide surfaces of the elastic vibrational member 21 at the common node of the aforesaid longitudinal and bending vibrations induced inside the vibrational member 21. That is, the piezoelectric members 25a, 25b are opposite to each other with the vibrational member 21 therebetween. The piezoelectric members 25a, 25b may be of the same material as the vibrational member 21, or different in material therefrom. The piezoelectric members 25a, 25b are not restricted in size, whereas the mass of them should be equalized substantially with each other.

Where the piezoelectric members 25a, 25b equal to each other in mass and electrical property are in face contact with the opposite surface portions of the vibrational member 21, the neutral plane Pn as illustrated in FIG. 1 is located substantially at the center in the direction of thickness of the vibrational member 21. As touched upon above with reference to FIG. 1, even when the longitudinal and bending vibrations induced inside the vibrational member 21 each become symmetric with respect to the neutral plane Pn, the motional vectors of such multi-mode vibrations are merely synthesized, but not "coupled".

As the piezoelectric member produces piezoelectricity with the vibrations caused on the vibrational member by its piezoelectric effect, it electrically polarizes to bring about an electric charge in the piezoelectric member.

The resonance controlling means 27 comprises a switching element 27a forming a make-and-break circuit between the vibrational member 21 and the piezoelectric member 25a. Though there occurs potential difference between the terminals of the switching element 27a of the resonance controlling means 27 due to the electrical polarization caused by the vibrations, the piezoelectric members 25a, 25b are kept in the electrically symmetric state with each other when the switching element 27a is open (open circuit). In this state, the vibrations induced in the vibrational member 21 are not coupled as mentioned above.

When the switching element 27 is closed (short circuit), the electric charge thus generated in the piezoelectric member 25a is discharged, and consequently, the piezoelectric member 25a is decreased in stiffness, so that the symmetry of the vibrations induced in the vibrational member 21 is no longer kept. As a result, the longitudinal and bending vibrations in the vibrational member 21 are "coupled" with single phase current, transferring the kinetic energy of the vibrations between them, to thereby bring about the intended elliptic motion Ve on the vibrational member 21.

The elliptic motion thus obtained can be extracted by, for instance, bringing a moving member such as a rotator R into frictional contact with the surface of the elastic vibrational member 21 being vibrated. Namely, the rotator R being in contact with the vibrational member 21 rotates in the opposite direction to the elliptic motion produced on the vibrational member 21. This ultrasonic actuator functions as a motor in conjunction with the rotator R. In the illustrated case, though the rotator R is brought into frictional contact with the surface 21b of the vibrational member 21, it may however come into contact with the surface 21a as indicated by R' in FIG. 2 so as to rotate in the reverse direction relative to the rotator R being in contact with the surface 21b. Otherwise, a plate-like or sheet-like object such as paper may be contacted with the vibrational member 21, so that it can be moved in one direction.

Figure 3:
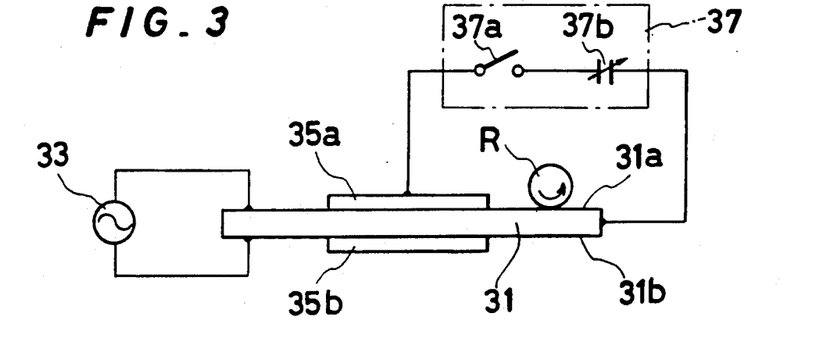
FIG. 3 is a schematic side view showing a second embodiment of this invention.

In the ultrasonic actuator illustrated in FIG. 3 as the second embodiment, the resonance controlling means 37 is composed of a make-and-break switching element 37a and a variable capacity element 37b. Varying the capacitance of the variable capacity element 37b, the extent of coupling of the longitudinal and bending vibrations excited in the vibrational member 31 with application of an alternating current can be controlled. This is because one of the piezoelectric members 35a, 35b can be changed in stiffness by switching on the switching element 37a to thereby vary the resonance characteristic of the vibrational member 31.

By controlling the variable capacity element 37b, the amplitude of the elliptic motion is freely controlled to change the speed of motion (rotation) of the moving member (rotator R).

In this embodiment, the make-and-break switching element 37a is not indispensable constituent of this invention, and therefore, may be omitted. Though the switching element 37a is arranged in a series relative to the variable capacity element 37b, it may be in parallel.

Figure 4:
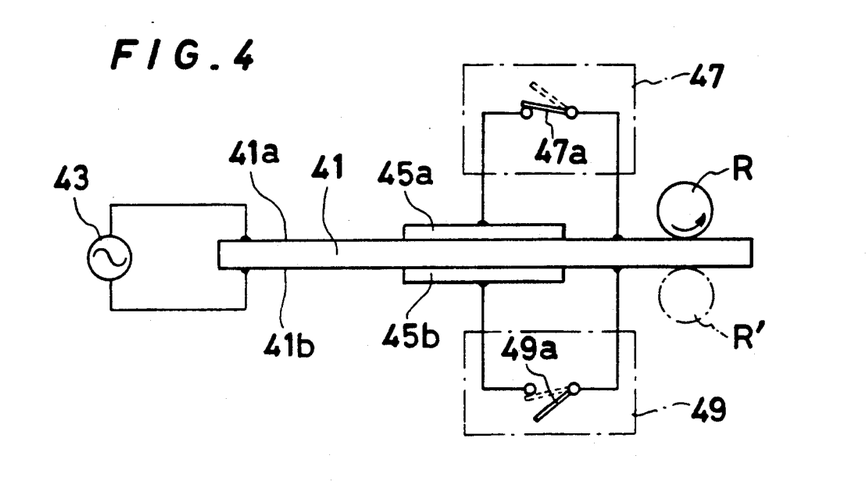
FIG. 4 is a schematic side view showing a third embodiment of this invention.

FIG. 4 illustrates the third embodiment in which the piezoelectric members 45a and 45b attached respectively to the opposite surfaces of the vibrational member 41 have resonance controlling means 47 and 49 connected thereto. The resonance controlling means 47, 49 are composed of make-and-break switching elements 47a and 49a.

By switching on either of the switching elements 47a, 49a under the condition such that the vibrational member 41 is excited by the exciting means 43, the characteristic of the in-plane resonance of the vibrational member 41 is changed to cause the longitudinal and bending vibrations to be coupled. In the case of turning on the switching element 47a and off the switching element 49a as indicated by the solid lines in FIG. 4, the rotators R and R' rotate in the opposite directions to each other. When turning off the switching element 47a and on the switching element 49a as indicated by the dotted lines, the directions of rotation of the rotators are reversed, respectively.

To be specific, the electric charge, which is produced in the piezoelectric members being in contact with the opposite surfaces of the vibrational member 41 by the piezoelectric effect, is discharged only from one of the piezoelectric members, so that the piezoelectric members assume electrical and vibrational asymmetry. As a result, the longitudinal and bending vibrations are coupled to produce the intended elliptic motion on the vibrational member with single phase current.

Figure 5:
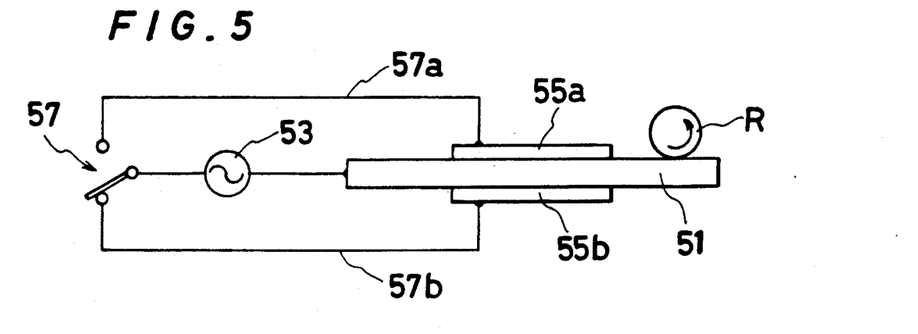
FIG. 5 is a schematic side view showing a fourth embodiment of this invention.

FIG. 5 illustrates the fourth embodiment wherein the exciting means 53 for activating the piezoelectric members 55a, 55b and the resonance controlling means 57 are integrated, so that a single phase alternating current from the exciting means 53 can be selectively applied to either of the piezoelectric members 55a, 55b. With the selective application of the single phase alternating current, one of the piezoelectric members 55a, 55b is vibrated to induce the longitudinal and bending vibrations in the vibrational member 51 and simultaneously cause the vibrations to be coupled. The vibrational member 51 in this embodiment is formed of a metallic or nonmetallic plate such as of stainless steel and aluminum.

The mechanism for bringing about the asymmetry in vibration as stated above in this embodiment is the same as the foregoing embodiments. Namely, in this embodiment an exciting circuit 57b through which an exciting current is applied to a piezoelectric member 55b serves as a short-circuit for discharging piezoelectricity generated in the piezoelectric member 55b. Another exciting circuit 57a connected to the piezoelectric member 55a is open. Thus, the piezoelectric members 55a, 55b assume the vibrational and electrically asymmetry, consequently to cause the longitudinal and bending vibrations induced in the vibrational member 51 to be coupled. As a result, the rotator R coming into frictional contact with the vibrational member 51 rotates in one direction.

In this embodiment, a variable capacity element as specified above may be interposed in either or both of the exciting circuits 57a, 57b.

In every ultrasonic actuator described above, the vibrational member induces the vibrations having a common node at the center of the vibrational member relative to the longitudinal direction.

Figure 6:
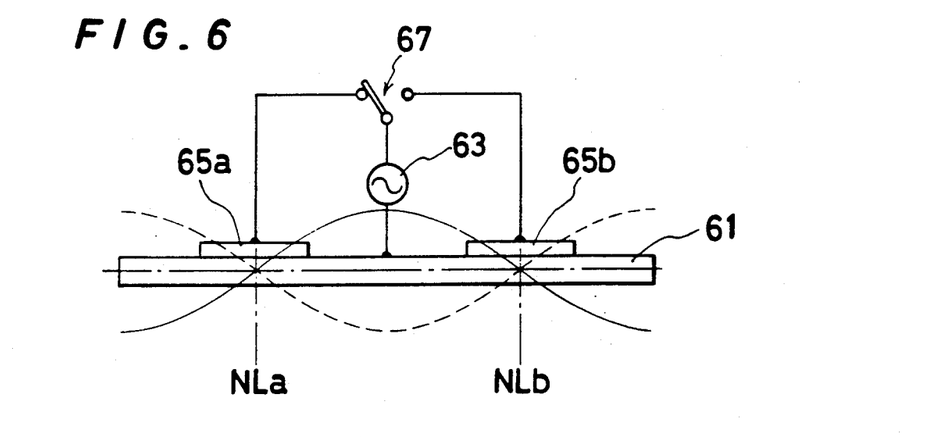
FIG. 6 is a schematic side view showing a fifth embodiment of this invention.

The ultrasonic actuator illustrated in FIG. 6 has an elastic vibrational member 61 provided on one wide surface thereof with piezoelectric members 65a, 65b, in which longitudinal and bending vibrations having two common nodes NLa and NLb are induced. The common nodes NLa and NLb of the vibrations are each located at the distance one-fourth from the respective lengthwise opposite ends of the vibrational member 61. The piezoelectric members 65a, 65b are respectively located about the nodes NLa, NLb. Since the vibrational components at the nodes NLa and LNb assume the opposite phases to each other, the structure in which the piezoelectric members 65a, 65b are disposed side by side on one surface of the vibrational member 61 is substantially equivalent to that wherein two piezoelectric members are arranged on the opposite surface of the vibrational member as in the foregoing embodiments.

The waveform shown in FIG. 6 notionally stands for the amplitude of the longitudinal vibration which is caused by expanding and contracting the vibrational member in the lengthwise direction; and the least amplitude is at the nodes NLa and NLb. Because the elastic vibrational member has a length of a multiple of one-half cycle of vibration ($\pi$), one or more nodes occur in the vibrational member according to the exciting frequency.

Figure 7:
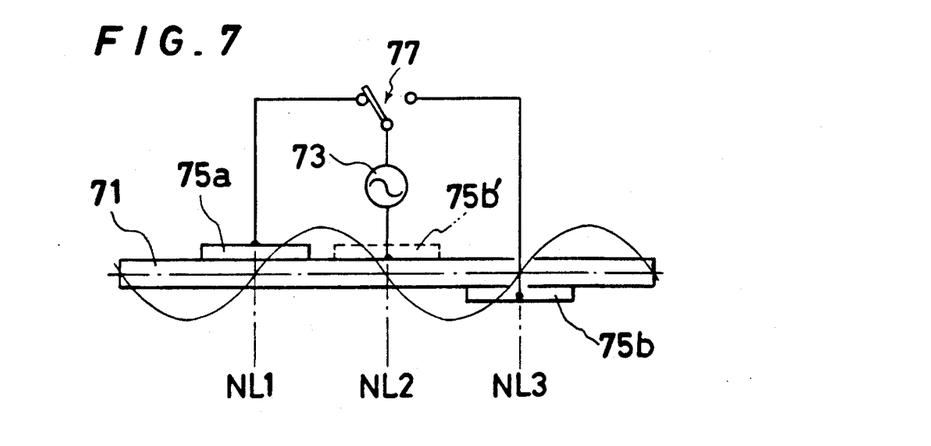
FIG. 7 is a schematic side view showing a sixth embodiment of this invention.

In the embodiment shown in FIG. 7, two-cycle vibration ($4\pi$) is induced in the elastic vibrational member 71. A first piezoelectric member 75a is disposed on one side of the vibrational member 71 about the first node NL1 of the vibrations induced therein, and a second piezoelectric member 75b is on the other side of the vibrational member 71 about the third node NL3, involving the antiphase relation in vibration between the piezoelectric member 75a, 75b. Therefore, the vibrating condition is substantially equivalent to the embodiment described above with reference to FIG. 6. In a case of disposing the second piezoelectric member 75b on the same surface of the vibrational member 71 on which the first piezoelectric member 75a is disposed, it may be placed about the second node NL2 (position 75b').

Figure 8:
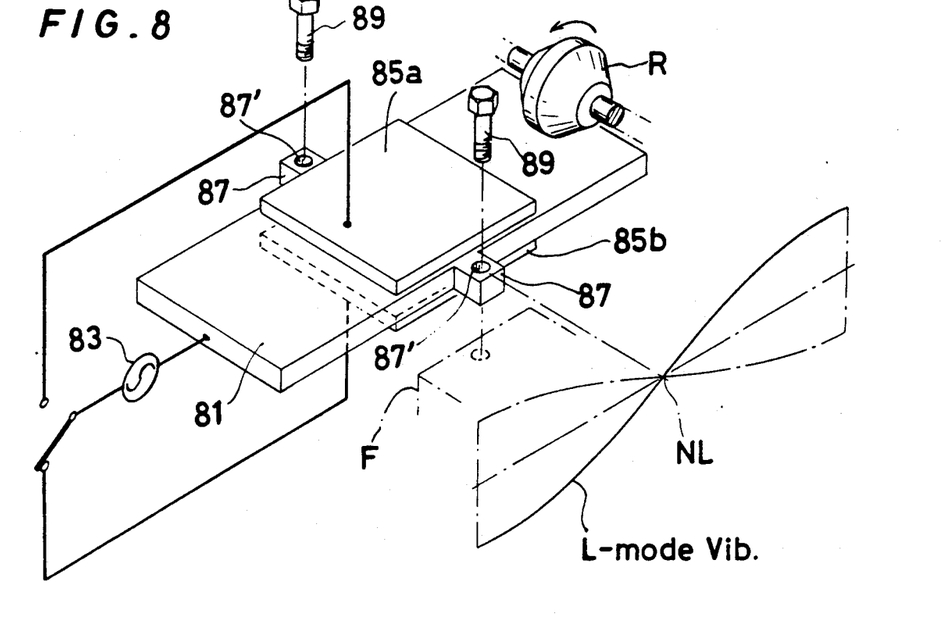
FIG. 8 is a schematic perspective view showing a seventh embodiment of this invention.

The seventh embodiment of this invention illustrated in FIG. 8 has a retaining structure for allowing the ultrasonic actuator of this invention to be mounted onto other base device or element so as to form, for instance, a motor. As one example, the retaining structure is composed of fixing portions 87 protruding sidewards from the middle portion of the vibrational member 81. With this retaining structure, the vibrational member 81 can be fixed onto the other base element without attenuating the vibrations induced in the vibrational member 81.

When the vibrations of one-half cycle are induced in the vibrational member 81 as illustrated in the drawing, the node NL of the longitudinal (L-mode) vibrations appears at the center of the vibrational member 81. Since the kinetic energy (amplitude) of the vibrations is zero in theory as shown in FIG. 8, the vibrations induced in the vibrational member 81 are little affected when the vibrational member is fixed onto the other base element by the fixing portions 87 placed about the node portion of the vibrations. The fixing portions 87 in this embodiment each have a fixing hole 87' through which a machine screw is thrust into a frame F of the other base element. The rotator R coming into frictional contact with the vibrational member 81 can rotate with high efficiency independent of the retaining structure secured onto the other base element.

Figure 9:
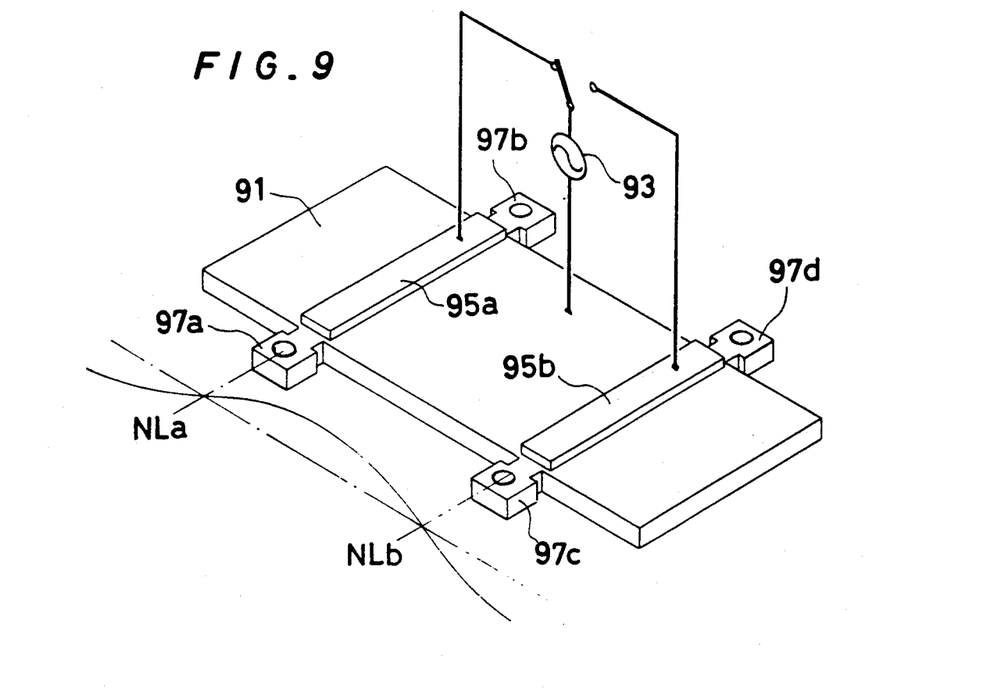
FIG. 9 is a schematic perspective view showing a eighth embodiment of this invention.

The embodiment illustrated in FIG. 9 based on that of FIG. 6 has likewise a retaining structure similar to that of the embodiment of FIG. 8. The retaining structure in this embodiment comprises fixing portions 97a, 97b, 97c and 97d each protruding sidewise from the vibrational node portions of the vibrational member 91 at which the nodes NLa and NLb of the vibrations induced in the vibrational member 91 are formed inevitably. Also in this embodiment, attenuation of the vibrations induced in the vibrational member 91 which is possibly caused by retaining the vibrational member can be reduced to a minimum.

Though the fixing portions of the retaining structures shown in FIGS. 8 and 9 are shaped in a protrusion, this should not be understood as limitative. For example, the vibrational member may be bored about the node portions of vibrations to form holes for allowing machine screws to pierce therethrough without protruding sidewise.

Figure 10:
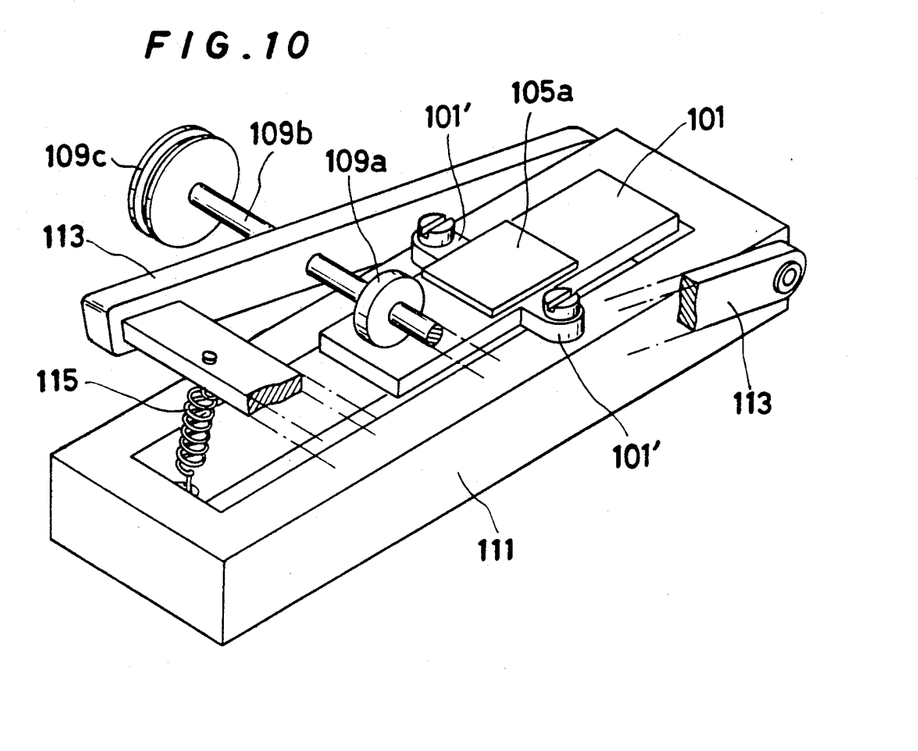
FIG. 10 is a schematic perspective view showing a ninth embodiment of this inveniton.

FIG. 10 schematically illustrates an ultrasonic actuator which was used in the experiments the inventors of the present invention were actually conducted.

The ultrasonic actuator 100 comprises an elastic vibrational member 101 provided on the opposite wide surfaces 101a, 101b with piezoelectric members 105a, 105b, an exciting means 103 for selectively applying a single phase alternating current to one of the piezoelectric members 105a, 105b, and a resonance controlling means (switching element 107) interposed between the exciting means 103 and the respective piezoelectric members 105a, 105b. The actuator 100 functions as a motor in conjunction with a rotator 109a being in frictional contact with one surface of the vibrational member 101. The actuator 100 is secured by a base frame 111 at fixing portions 101' protruding sidewise from the vibrational member 101. The rotator 109a is rotatably supported by an arm member 113 having one end pivotally held by the base frame 111 and brought into press contact with the vibrational member 101 by means of a spring 115.

Figure 11:
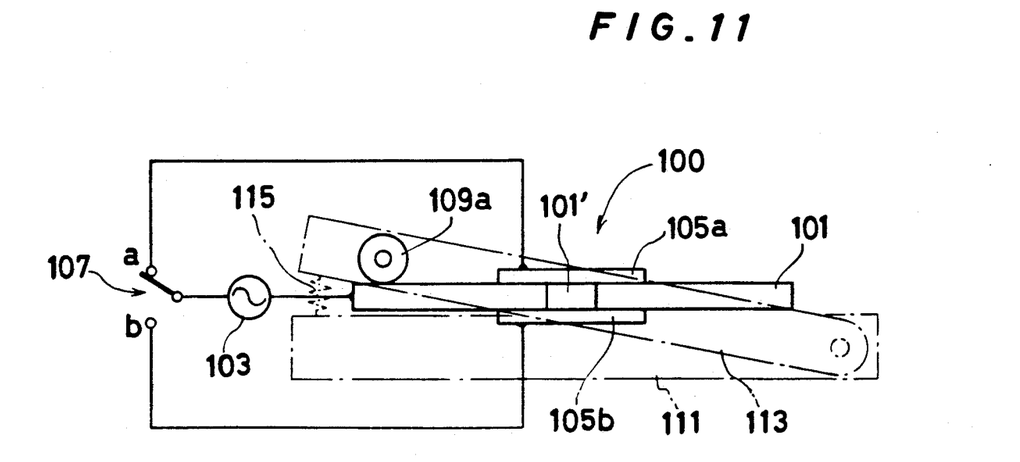
FIG. 11 is a schematic side view of FIG. 10.

The exciting means 103 and resonance controlling means 107 are connected with the piezoelectric members 105a, 105b as shown in FIG. 11.

In the experiment, the piezoelectric member 105a was supplied with the alternating current from the exciting means 103 to excite longitudinal and bending vibrations inside the vibrational member 101, consequently to produce elliptic motions on the vibrational member and rotate the rotator 109a being in contact with the vibrational member 101. Then, the rotational torque of the rotating rotator 109a was measured. In the experiment, the vibrational member 101 made of a stainless steel (SUS420) plate of 37.3 mm in length, 1 mm in thickness and 8 mm in width was used with the piezoelectric members of a lead zirconate titanate (PZT) plate of 25 mm in length, 0.5 mm in thickness and 8 mm in width. The rotator 109a formed from a stainless steel material (SUS 304) and having a diameter of 10 mm was used and pressed against the vibrational member 101 at a pressure of about 50 gram. The exciting source of 98 kHz in frequency and 11 volt was used to actuate the rotator 109a. The rotational torque of the rotating rotator 109a was detected by use of a pulley 109c attached to a shaft 109b by which the rotator 109a is supported.

At the outset, the switching element 107 serving as the resonance controlling means was connected with the terminal (a) to activate the piezoelectric member 105a. That is to say, the piezoelectric member 105a was shortcircuited. At that time, the rotator 109a was rotated at about 600 rpm, causing a rotational torque of 15 gram-cm.

Next, when the switching element 107 was turned to the terminal (b) so as to activate (concurrently shortcircuit) the piezoelectric member 105b, the rotator 109a was rotated at about 500 rpm in the reverse direction, causing a rotational torque of 14 gram-cm.

Figure 12:
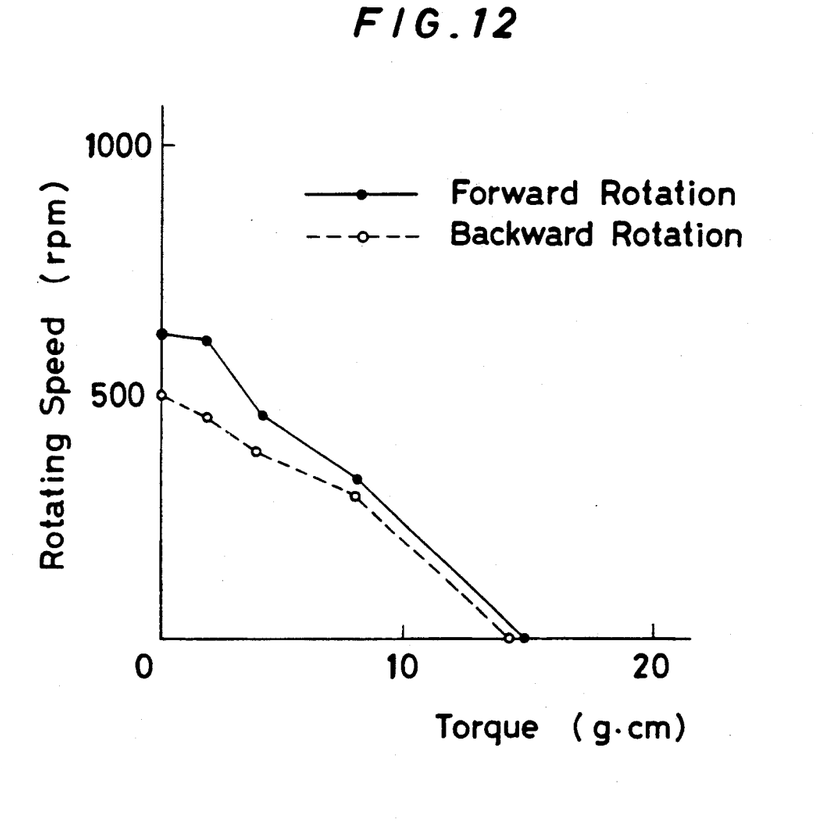
FIG. 12 is a graph showing the driving performance of the ninth embodiment of FIG. 10.

The results of this experiment are shown in FIG. 12, wherein the characteristics of the rotating speed and rotational torque at which the rotator 109a of the ultrasonic actuator noted above was activated. In this drawing, the characterisitcs indicated by the solid line were obtained where the piezoelectric member 105a was excited, and those indicated by the dotted line were obtained where the piezoelectric member 105b was excited.

As is understood from the results of the experiment, according to the present invention, excellent motional performance of the ultrasonic actuator can be achieved in spite of single phase current with which the piezoelectric members are supplied. If the ultrasonic actuator of this invention is excited by polyphase currents, it can of course be activated more efficiently than the conventional ultrasonic actuator of the type driven by the polyphase currents. Furthermore, by using a number of piezoelectric members to be arranged about a plurality of vibrational node portions of the elastic vibrational member, the efficiency and driving performance can be notably increased.

Although the description has been so far given on the assumption that the ultrasonic actuator according to this invention is applied particularly to a linear motor and rotary motor, the actuator of this invention is applicable extensively to not merely mechanical elements capable of transforming standing-wave vibrations to rectilinear or circular motion with high efficiency, but also electronic elements such as mechanical-electronic filters as a resonance controller by utilization of the phenomenon such that the resonance frequency of an elastic vibrational member varies with the change in sonic velocity of a piezoelectric member.

As is apparent from the foregoing, an ultrasonic actuator according to the present invention can induce longitudinal and bending vibrations even by single phase current and cause the multi-mode vibrations thus induced to be coupled to produce the desired elliptic motion with notably high efficiently. Therefore, various types of linear or rotary motors of high efficiency which are simple in structure and excel in driving ability can be accomplished. According to the method of this invention, the longitudinal and bending vibrations concurrently induced inside the vibrational member with single phase current can be effectively coupled by selectively discharging a piezoelectric charge which is generated in the piezoelectric member attached to the vibrational member. Accordingly, there can be fully and easily compensated fluctuations in resonance vibrations which possibly occur due to environmental factors such as the mass changes caused by providing the piezoelectric members on the vibrational member, consequently to facilitate manufacture and adjustment of the ultrasonic actuator.

Moreover, according to this invention, since the resonance characteristics of the elastic vibrational member can be easily controlled by using the resonance controlling means such as a make-and-break switching element and variable capacity element, the momentum produced by exciting the vibrational member can be regulated accurately and reversed in direction of motion so as to attain a high efficiency reversible motor.

As many apparently widely different embodiments of this invention may be made without departing from the spirt and scope thereof, it is to be understood that the invention is not limited to the specific embodiments thereof except as defined in the appended claims.

What is claimed is:

1. A vibration-coupling type ultrasonic actuator comprising an elastic vibrational member having a shape in which longitudinal and bending vibrations are induced concurrently with resonance frequency of single phase, an exciting means formed on said vibrational member for exciting said vibrational member so as to produce said vibrations in said vibrational member, at least one piezoelectric member disposed on said vibrational member about one or more common nodes of vibrations excited inside said vibrational member, and at least one resonance controlling means being in electrical connection with said vibrational member and at least one piezoelectric member so as to discharge an electric charge generated in said piezoelectric member by said longitudinal and bending vibrations to thereby cause said vibrations to be coupled.

2. The ultrasonic actuator according to claim 1, wherein said vibrational member is formed of a rectangular plate of piezoelectric material, to which a single phase alternating current is applied from said exciting means.

3. The ultrasonic actuator according to claim 2, wherein said resonance controlling means is composed of an electric switching element for selectively shortcircuiting said piezoelectric member to said vibrational member.

4. The ultrasonic actuator according to claim 2, wherein said resonance controlling means is composed of a variable capacity element by which said piezoelectric member selectively varies in capacitance.

5. The ultrasonic actuator according to claim 1, wherein said vibrational member is formed of a rectangular metallic or nonmetallic plate, and said piezoelectric member is supplied with a single phase alternating current from said exciting means.

6. The ultrasonic actuator according to claim 5, wherein said resonance controlling means is composed of an electric switching element for selectively shortcircuiting said piezoelectric member to said vibrational member.

7. The ultrasonic actuator according to claim 5, said resonance controlling means is composed of a variable capacity element by which said piezoelectric member selectively varies in capacitance.

8. The ultrasonic actuator according to claim 1, wherein said resonance controlling means is composed of an electric switching element which is connected with said vibrational member and said piezoelectric members disposed on opposite surfaces of said vibrational member so as to apply an alternating current from said exciting means selectively to one of said piezoelectric members through said switching element.

9. The ultrasonic actuator according to claim 1, wherein said piezoelectric member is attached to either surface of said vibrational member, and said resonance controlling means is composed of an electric switching element is connected with said vibrational member and one of said piezoelectric members so as to apply a single phase alternating current from said exciting means to one of said piezoelectric members through said switching element.

10. The ultrasonic actuator according to claim 1, further comprising a moving member being in frictional contact with said vibrational member so as to extract kinetic energy of the vibrations induced in said vibrational member.

11. The ultrasonic actuator according to claim 10, wherein said moving member is a rotator.

12. The ultrasonic actuator according to claim 1, wherein said piezoelectric member is attached to either surface of said vibrational member about the node of vibrations induced in said vibrational member.

13. The ultrasonic actuator according to claim 1, wherein a plurality of said piezoelectric members are disposed on said vibrational member about two or more nodes of vibrations induced in said vibrational member, respectively.

14. The ultrasonic actuator according to claim 1, wherein said vibrational member is provided about said one or more nodes of vibrations induced therein with fixing portions for retaining said vibrational member.

15. A method for operating a vibration-coupling type ultrasonic actuator having an elastic vibrational member for concurrently producing longitudinal and bending vibrations therein and at least one piezoelectric member disposed on said vibrational member, which comprises exciting said vibrational member with a single phase alternating current to generate difference of electric potential in said piezoelectric member, and discharging said potential generated in said piezoelectric member to said vibrational member to thereby cause said longitudinal and bending vibrations induced in said vibrational member to be coupled.

16. The method according to claim 15, wherein said electric potential generated in said piezoelectric member is dischraged by shortcircuiting said piezoelectric member to said vibrational member through an electric switching element.

17. The method according to claim 15, wherein said electric potential generated in said piezoelectric member is controlled by varying capacitance between said piezoelectric member and vibrational member through a variable capacity means.

18. The method according to claim 15, wherein said coupled longitudinal and bending vibrations are extracted in the form of kinetic energy by bringing a rotator into press contact with said vibrational member.

* * * * *